United States Patent
Xu et al.

(10) Patent No.: US 10,973,084 B2
(45) Date of Patent: Apr. 6, 2021

(54) INTERNET-OF-THINGS DESIGN FOR UNLICENSED SPECTRUM

(71) Applicant: QUALCOMM Incorporated, San Diego, CA (US)

(72) Inventors: Hao Xu, Beijing (CN); Srinivas Yerramalli, San Diego, CA (US); Juan Montojo, San Diego, CA (US); Yongbin Wei, La Jolla, CA (US); Peter Gaal, San Diego, CA (US); Wanshi Chen, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/683,879

(22) Filed: Nov. 14, 2019

(65) Prior Publication Data
US 2020/0084832 A1  Mar. 12, 2020

Related U.S. Application Data

(62) Division of application No. 15/589,989, filed on May 8, 2017, now Pat. No. 10,506,662.

(Continued)

(51) Int. Cl.
*H04W 72/00* (2009.01)
*H04W 84/18* (2009.01)
(Continued)

(52) U.S. Cl.
CPC ............ *H04W 84/18* (2013.01); *H04B 1/713* (2013.01); *H04L 1/0071* (2013.01);
(Continued)

(58) Field of Classification Search
CPC ....... H04W 84/18; H04W 4/70; H04W 16/16; H04W 28/021; H04W 84/10;
(Continued)

(56) References Cited

U.S. PATENT DOCUMENTS 8,744,452 B2 * 6/2014 Carter ................... H04W 16/10
                                                              455/444
2007/0097942 A1   5/2007 Gorokhov et al.
(Continued)

FOREIGN PATENT DOCUMENTS

WO   2016108580 A1   7/2016

OTHER PUBLICATIONS

Itri., et al., "Resource Allocation and Channel Access for PUSCH," 3GPP, Draft; R1-162985, 3rd Generation Partnership Project (3GPP), Mobile Competence Centre; 650, Route Des Lucioles; F-06921 Sophia-Antipolis Cedex; France; vol. RAN WG1, no. Busan, Korea; Apr. 11, 2016-Apr. 15, 2016; Apr. 1, 2016 (Apr. 1, 2016), 4 Pages, XP051079747, Retrieved from the Internet: URL:http://www.3gpp.org/ftp/tsg_ran/WG1_RL1/TSGR1_84b/Docs/, [retrieved on Apr. 1, 2016].

(Continued)

*Primary Examiner* — Erika A Washington
(74) *Attorney, Agent, or Firm* — Patterson + Sheridan, LLP

(57) ABSTRACT

Certain aspects of the present disclosure relate to methods and apparatus for wireless communication, and more particularly, to design principles for extending Internet of Things (IoT) (e.g., narrowband IoT (NB-IoT), machine type communication(s) (MTC), etc.) into an unlicensed radio frequency (RF) band spectrum. In certain aspects, the method generally includes determining an interlace structure of tones, within an unlicensed radio frequency (RF) spectrum, available to a wireless node for communication, and (Continued)

communicating based on the interlace structure. In some aspects, the communicating involves hopping between tones within the interlace structure during different communication intervals.

17 Claims, 10 Drawing Sheets

Related U.S. Application Data

(60) Provisional application No. 62/334,439, filed on May 10, 2016.

(51) Int. Cl.
    *H04B 1/713*     (2011.01)
    *H04L 1/00*     (2006.01)
    *H04L 29/08*     (2006.01)
    *H04W 4/70*     (2018.01)
    *H04W 16/16*     (2009.01)
    *H04W 28/02*     (2009.01)
    *H04W 84/10*     (2009.01)
    *H04W 92/18*     (2009.01)
    *H04L 5/00*     (2006.01)

(52) U.S. Cl.
    CPC ...... *H04L 29/08306* (2013.01); *H04L 67/104* (2013.01); *H04W 4/70* (2018.02); *H04W 16/16* (2013.01); *H04W 28/021* (2013.01); *H04W 84/10* (2013.01); *H04W 92/18* (2013.01); *H04L 5/001* (2013.01)

(58) Field of Classification Search
    CPC ...... H04W 92/18; H04B 1/713; H04L 1/0021; H04L 67/104; H04L 29/08306
    See application file for complete search history.

(56) References Cited

U.S. PATENT DOCUMENTS

| | | | |
|---|---|---|---|
| 2009/0196274 A1 | 8/2009 | Rimini et al. | |
| 2011/0170483 A1* | 7/2011 | Ishii | H04W 72/0446 370/328 |
| 2015/0043520 A1* | 2/2015 | Sun | H04L 5/005 370/330 |
| 2015/0063148 A1* | 3/2015 | Sadek | H04W 24/08 370/252 |
| 2015/0085794 A1 | 3/2015 | Chen et al. | |
| 2016/0050667 A1 | 2/2016 | Papasakellariou et al. | |
| 2016/0100407 A1 | 4/2016 | Gaal et al. | |
| 2016/0302076 A1* | 10/2016 | Chou | H04W 52/0225 |
| 2016/0316374 A1 | 10/2016 | Xu et al. | |
| 2016/0330678 A1* | 11/2016 | Yoon | H04L 5/00 |
| 2016/0344526 A1 | 11/2016 | Fan et al. | |
| 2017/0230972 A1* | 8/2017 | Wang | H04L 5/0048 |
| 2017/0332440 A1 | 11/2017 | Xu et al. | |
| 2018/0048498 A1* | 2/2018 | Stern-Berkowitz | H04W 16/14 |
| 2018/0145819 A1* | 5/2018 | Axmon | H04L 5/16 |
| 2018/0213499 A1* | 7/2018 | Lee | H04W 56/0015 |
| 2018/0343669 A1* | 11/2018 | Wang | H04W 74/0816 |

OTHER PUBLICATIONS

Ericsson: "Uplink Resource Allocation Design for Enhanced LAA," 3GPP Draft; R1-163138, 3rd Generation Partnership Project (3GPP), Mobile Competence Centre ; 650, Route Des Lucioles , F-06921 Sophia-Antipolis Cedex; France; vol. RAN WG1, no. Busan, Korea; Apr. 11, 2016-Apr. 15, 2016; Apr. 2, 2016 (Apr. 2, 2016), XP051080554, 4 Pages, Retrieved from the Internet: URL:http://www.3gpp.org/ftp/tsg_ran/WG1_RL1/TSGR1_84b/Docs/[retrieved on Apr. 2, 2016].
Huawei., et al., "PUSCH transmission for eLAA," 3GPP Draft; R1-160300, 3rd Generation Partnership Project (3GPP), Mobile Competence Centre; 650, Route Des Lucioles; F-06921 Sophia-Antipolis Cedex; France; vol. RAN WG1, no. St. Julian's, Malta; Feb. 15, 2016-Feb. 19, 2016; Feb. 6, 2016 (Feb. 6, 2016), XP051064118, 7 Pages, Retrieved from the Internet: URL: http://www.3gpp.org/ftp/tsg_ran/WG1_RL1/TSGR1_84/Docs/ [retrieved on Feb. 6, 2016].
Huawei., et al., "Resource Allocation for RB Interleaved PUSCH for eLAA," 3GPP Draft; R1-162583, 3rd Generation Partnership Project (3GPP), Mobile Competence Centre; 650, Route Des Lucioles; F-06921 Sophia-Antipolis Cedex; France; vol. RAN WG1, no. Busan, Korea; Apr. 11, 2016-Apr. 15, 2016; Apr. 2, 2016 (Apr. 2, 2016), XP051080271, 8 Pages, Retrieved from the Internet: URL:http://www.3gpp.org/ftp/tsg_ran/WG1_RL1/TSGR1_84b/Docs/, [retrieved on Apr. 2, 2016].
International Search Report and Written Opinion—PCT/US2017/031768—ISA/EPO—dated Sep. 20, 2017.
NTT Docomo., et al., "Discussion on Channel Access Framework for Potential LAA UL," 3GPP Draft; R1-157220; Discussion on UL Channel Access_Final, 3rd Generation Partnership Project (3GPP), Mobile Competence Centre; 650, Route Des Lucioles; F-06921 Sophia-Antipolis Cedex; France; vol. RAN WG1 , no. Anaheim, USA; Nov. 15, 2015-Nov. 22, 2015; Nov. 15, 2015 (Nov. 15, 2015), XP051003444, Retrieved from the Internet: URL:http: //www.3gpp.org/ftp/Meetings_3GPP_Sync/RAN1/Docs/ [retrieved on Nov. 15, 2015].
Partial International Search Report—PCT/US2017/031768—ISA/EPO—dated Jul. 25, 2017.
Qualcomm Incorporated: "PUSCH design details for LAA," 3GPP Draft; R1-160884; 3rd Generation Partnership Project (3GPP), Mobile Competence Centre, 650, Route Des Lucioles; F-06921; Sophia-Antipolis Cedex; France; vol. RAN WG1, no. St. Julian's. Malta; Feb. 15, 2016-Feb. 19, 2016; Feb. 6, 2016 (Feb. 6, 2016). XP051064431, pp. 4. Retrieved from the Internet: URL: http://www.3gpp.org/ftp/tsg_ran/WG1_RL1/TSGR1_84/Docs/ [retrieved on Feb. 6, 2016].
Huawei., et al., "Further details on UL LBT to enable UE multiplexing of uplink transmissions," 3GPP; R1-162102, 3rd Generation Partnership Project (3GPP), Busan, Korea, Apr. 11-15, 2016 (Retrieved on Feb. 6, 2016), 7 Pages.
Huawei., et al., "Further Details on UL LBT to Enable UE Multiplexing of Uplink Transmissions", 3GPP Draft; 3GPP TSG RAN WG1 Meeting #84bis, R1-162102, 3rd Generation Partnership Project (3GPP), Mobile Competence Centre, 650, Route Des Lucioles, F-06921 Sophia-Antipolis Cedex, France, vol. RAN WG1, No.Busan, Korea, Apr. 11, 2016-Apr. 15, 2016, Apr. 2, 2016 (Apr. 2, 2016), XP051079949, 7 Pages, Retrieved from the Internet : URL: http://www.3gpp.org/ftp/tsg_ran/WG1_RL1/TSGR1_84b/Docs/ [retrieved on Apr. 2, 2016].
Taiwan Search Report—TW106115416—TIPO—dated Feb. 24, 2020.

\* cited by examiner

US 10,973,084 B2

INTERNET-OF-THINGS DESIGN FOR UNLICENSED SPECTRUM

CLAIM OF PRIORITY

This application is a divisional of U.S. patent application Ser. No. 15/589,989, filed May 8, 2017, which claims the benefit of U.S. Provisional Patent Application Ser. No. 62/334,439, filed May 10, 2016, which are assigned to the assignee of the present application and hereby expressly incorporated by reference herein in their entirety.

BACKGROUND

Field of the Disclosure

The present disclosure relates generally to wireless communication, and more particularly, to methods and apparatus for Internet of Things (IoT) and Machine Type Communication(s) (MTC) design.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example is Long Term Evolution (LTE). LTE/LTE-Advanced (LTE-A) is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

The present disclosure relates generally to wireless communication, and more particularly, to design principles for extending Internet of Things (NB-IoT) and machine type communication (MTC) into an unlicensed radio frequency (RF) band spectrum.

Certain aspects of the present disclosure provide a method for wireless communications. The method generally includes determining an interlace structure of tones, within an unlicensed radio frequency (RF) spectrum, available to a wireless node for communication, and communicating based on the interlace structure, wherein the communicating involves hopping between tones within the interlace structure during different communication intervals.

Certain aspects of the present disclosure provide a method for wireless communications. The method generally includes determining if a narrowband region within an unlicensed radio frequency (RF) spectrum is available for transmissions, wherein the determining comprises determining if the narrowband region is available based on a configuration of transmission gaps assigned to support sharing of the narrowband region, and transmitting on the narrowband region if it is determined the narrowband region is available.

Certain aspects of the present disclosure provide an apparatus for wireless communication. The apparatus generally includes a processing system configured to determine an interlace structure of tones, within an unlicensed radio frequency (RF) spectrum, available to the apparatus for communication, and a transceiver configured to communicate based on the interlace structure, wherein the communicating involves hopping between tones within the interlace structure during different communication intervals.

Certain aspects of the present disclosure provide an apparatus for wireless communication. The apparatus generally includes a processing system configured to determine if a narrowband region within an unlicensed radio frequency (RF) spectrum is available for transmissions, wherein the determining comprises determining if the narrowband region is available based on a configuration of transmission gaps assigned to support sharing of the narrowband region, and a transmitter configured to transmit on the narrowband region if it is determined the narrowband region is available.

Certain aspects of the present disclosure provide an apparatus for wireless communication. The apparatus generally includes means for determining an interlace structure of tones, within an unlicensed radio frequency (RF) spectrum, available to the apparatus for communication, and means for communicating based on the interlace structure, wherein the communicating involves hopping between tones within the interlace structure during different communication intervals.

Certain aspects of the present disclosure provide an apparatus for wireless communication. The apparatus generally includes means for determining if a narrowband region within an unlicensed radio frequency (RF) spectrum is available for transmissions, wherein the means for determining comprises means for determining if the narrowband region is available based on a configuration of transmission gaps assigned to support sharing of the narrowband region, and means for transmitting on the narrowband region if it is determined the narrowband region is available.

Certain aspects of the present disclosure provide a computer-readable medium having instructions stored thereon for determining an interlace structure of tones, within an unlicensed radio frequency (RF) spectrum, available to an apparatus for communication, and communicating based on the interlace structure, wherein the communicating involves hopping between tones within the interlace structure during different communication intervals.

Certain aspects of the present disclosure provide a computer-readable medium having instructions stored thereon for determining if a narrowband region within an unlicensed radio frequency (RF) spectrum is available for transmissions, wherein the determining comprises determining if the narrowband region is available based on a configuration of transmission gaps assigned to support sharing of the narrowband region, and transmitting on the narrowband region if it is determined the narrowband region is available.

Other aspects, features, and embodiments of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the present disclosure. In similar fashion, while exemplary aspects may be discussed below as device, system, or method aspects it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
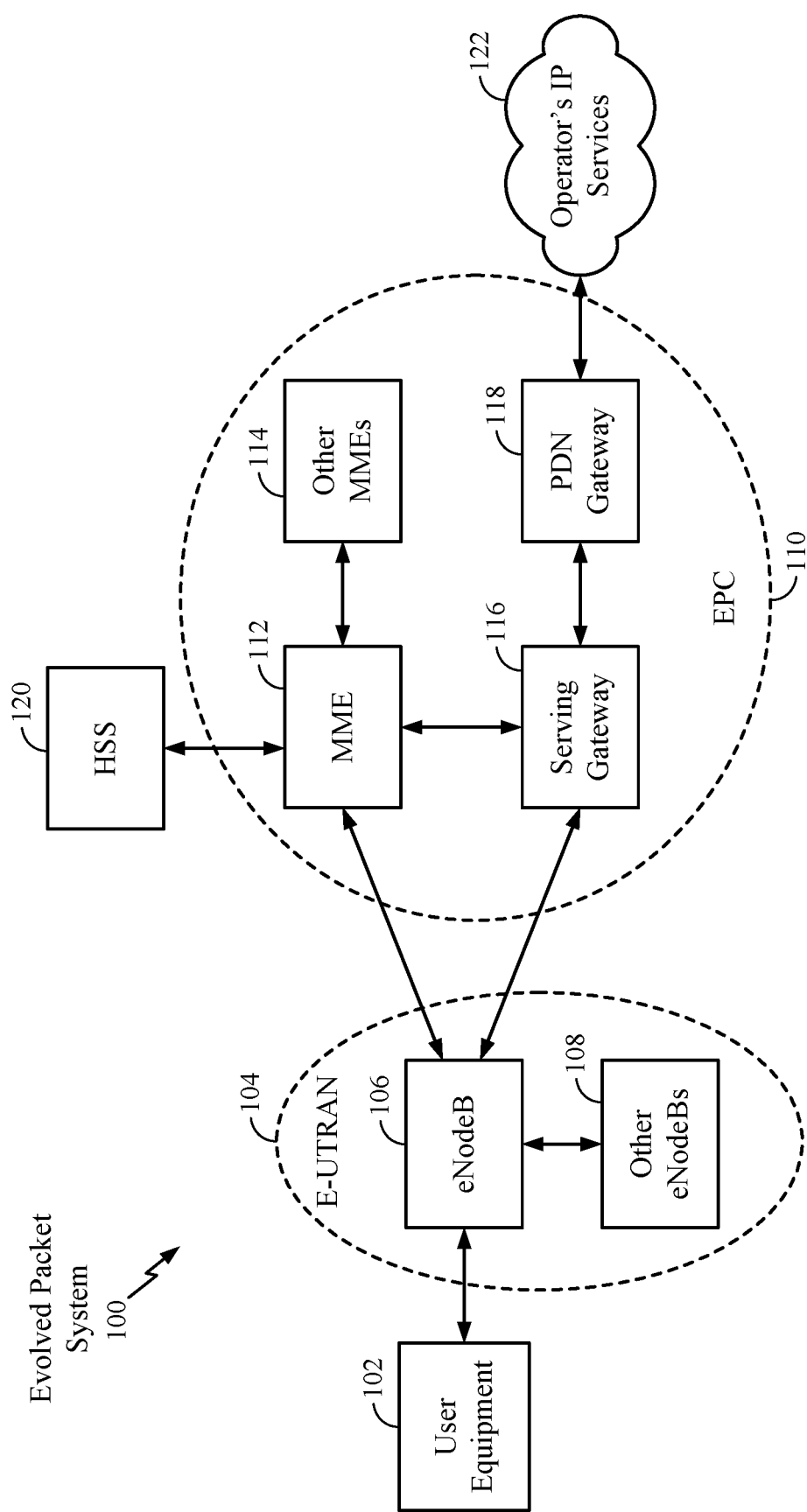
FIG. 1 is a diagram illustrating an example of a network architecture.

Narrow-Band IoT (NB-IoT) is a technology being standardized by the 3GPP standards body. This technology is a narrowband radio technology specially designed for IoT, hence its name. Special focuses of this standard are on indoor coverage, low cost, long battery life and large number of devices. The NB-IoT technology may be deployed "in-band", utilizing resource blocks within, for example, a normal long term evolution (LTE) spectrum or Global System for Mobile communications (GSM) spectrum. In addition, NB-IoT may be deployed in the unused resource blocks within a LTE carrier's guard-band, or "standalone" for deployments in dedicated spectrum.

Machine type communications (MTC) and/or enhanced MTC (eMTC) may refer to communication involving at least one remote device on at least one end of the communication and may include forms of data communication which involve one or more entities that do not necessarily need human interaction. MTC devices may include devices that are capable of MTC and/or eMTC communications with MTC servers and/or other MTC devices through Public Land Mobile Networks (PLMN), for example. Aspects of the present disclosure are generally directed to design principles for deploying IoT (e.g., NB-IoT, MTC, and/or eMTC, etc.) in an unlicensed radio frequency (RF) band spectrum.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). An example of an emerging telecommunication standard is new radio (NR), for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, MIMO antenna technology, and carrier aggregation. These communications networks are merely listed as examples of networks in which the techniques described in this disclosure may be applied; however, this disclosure is not limited to the above-described communications network.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn attention, especially in the uplink (UL) communications where lower PAPR greatly benefits the wireless node in terms of transmit power efficiency.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Some next generation, NR, or 5G networks may include a number of base stations, each simultaneously supporting communication for multiple communication devices, such as UEs. In LTE or LTE-A network, a set of one or more base stations may define an e NodeB (eNB). In other examples (e.g., in a next generation or 5G network), a wireless multiple access communication system may include a number of distributed units (e.g., edge units (EUs), edge nodes (ENs), radio heads (RHs), smart radio heads (SRHs), transmission reception points (TRPs), etc.) in communication with a number of central units (e.g., central nodes (CNs), access node controllers (ANCs), etc.), where a set of one or more distributed units, in communication with a central unit, may define an access node (e.g., a new radio base station (NR BS), a new radio node-B (NR NB), a network node, gNB, etc.). A base station or DU may communicate with a set of UEs on downlink channels (e.g., for transmissions from a base station or to a UE) and uplink channels (e.g., for transmissions from a UE to a base station or distributed unit).

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, augmented reality goggles, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a navigation/position location (e.g., global positioning system (GPS), Beidou, terrestrial-based, etc.) device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as IoT devices.

Example Wireless Communications System

FIG. 1 is a diagram illustrating an LTE network architecture 100 in which aspects of the present disclosure may be practiced. For example UE 102 may receive an uplink grant from an eNB 106 or 108 indicating one or more tones within a resource block (RB) allocated to the UE for narrowband communication. The UE 102 may then transmit using the one or more tones indicated in the uplink grant.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, a camera/security camera, a gaming device, a wearable device (e.g., smart watch, smart glasses, smart ring, smart bracelet, smart wrist band, smart jewelry, smart clothing, etc.), any other similar functioning device, etc. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an Si interface to the EPC 110. The EPC 110 includes a Mobility Management Entity (MME) 112, other MMES 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE102 may be coupled to the PDN through the LTE network.

Figure 2:
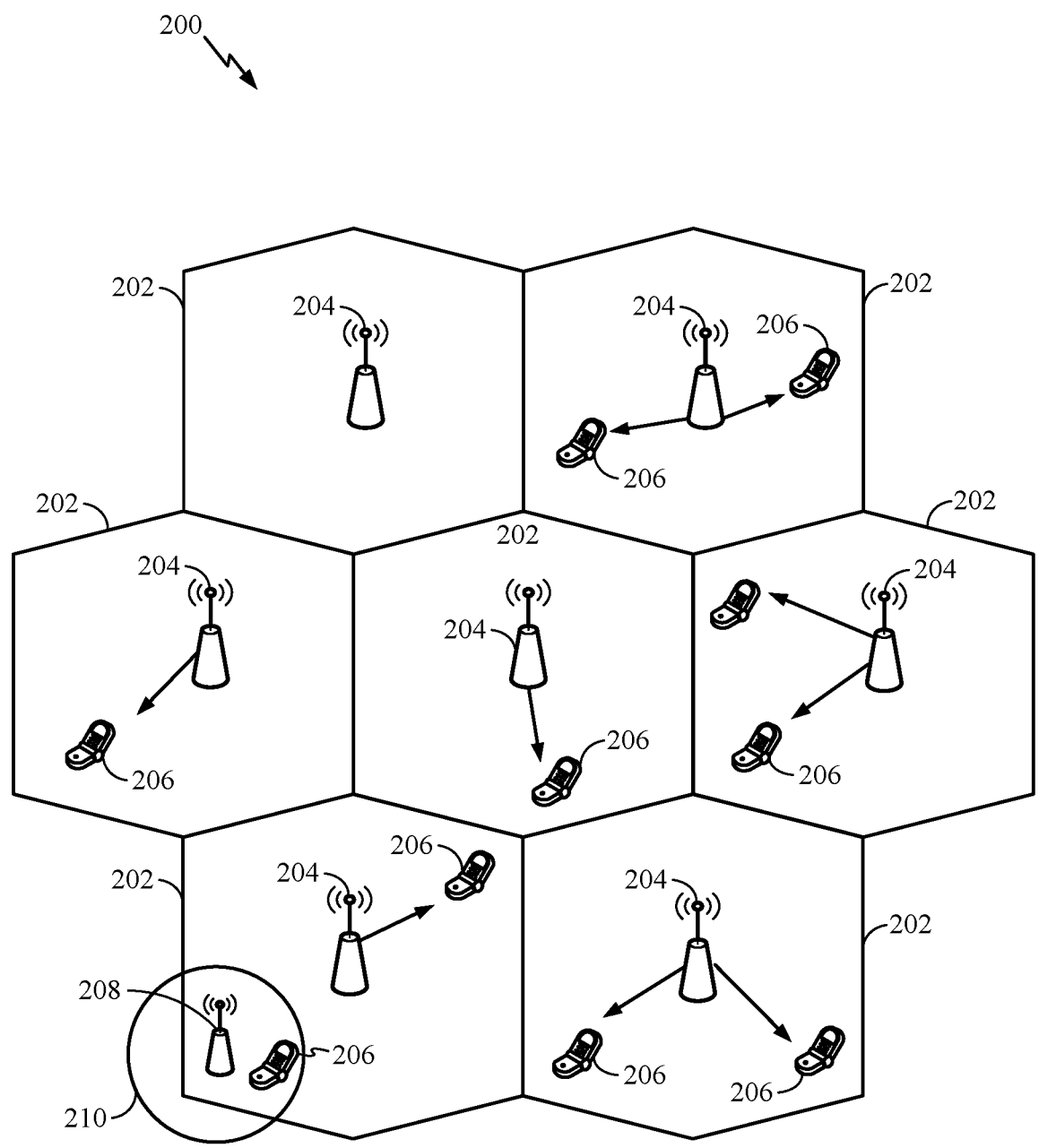
FIG. 2 is a diagram illustrating an example of an access network.

FIG. 2 is a diagram illustrating an example of an access network 200 in an LTE network architecture in which aspects of the present disclosure may be practiced. For example, UEs 206 and eNBs 204 may be configured to implement techniques for implementing a new transmission scheme for NB-IoT described in aspects of the present disclosure.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network may be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
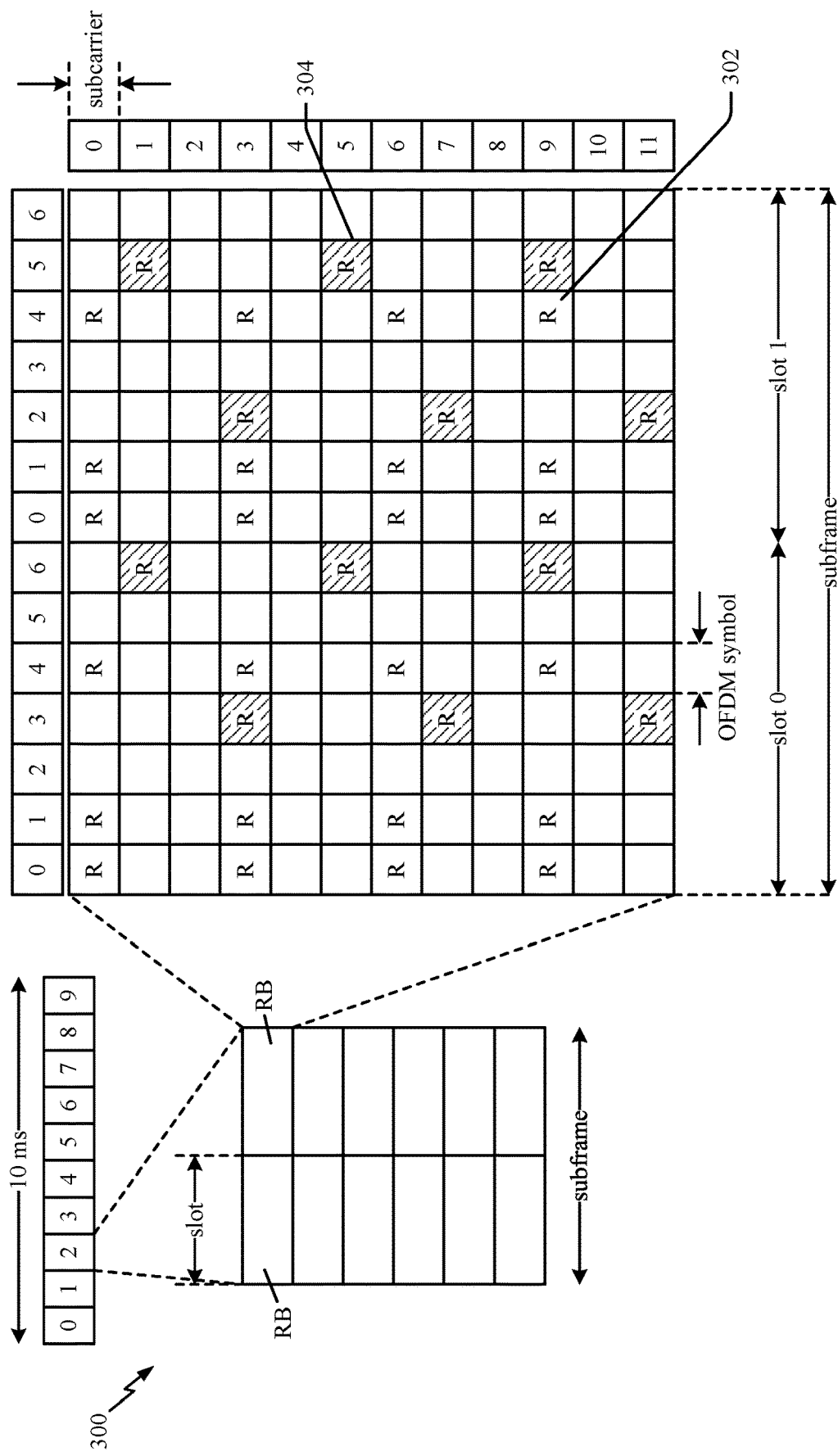
FIG. 3 is a diagram illustrating an example of a downlink (DL) frame structure in long-term evolution (LTE).

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.8 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
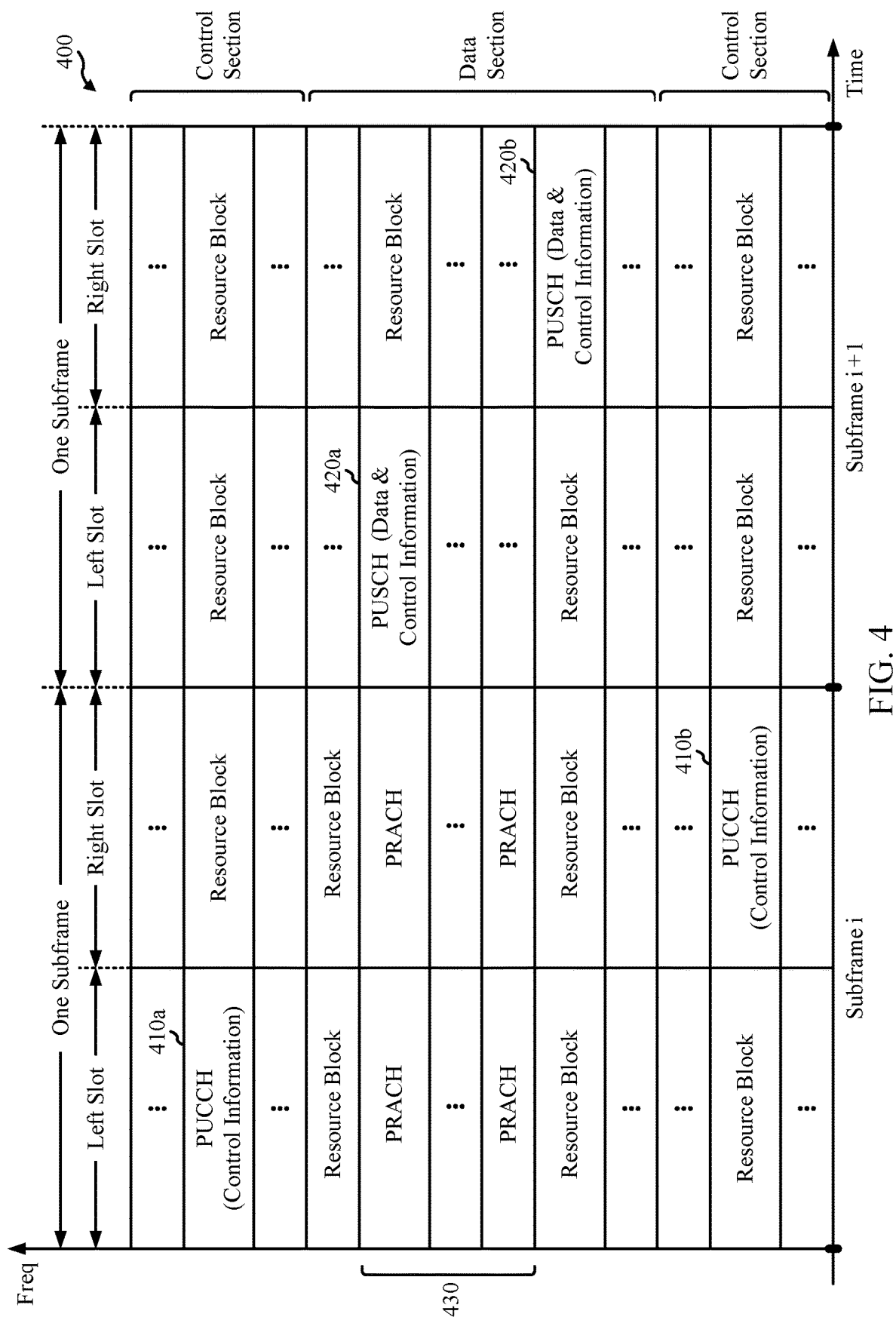
FIG. 4 is a diagram illustrating an example of an uplink (UL) frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
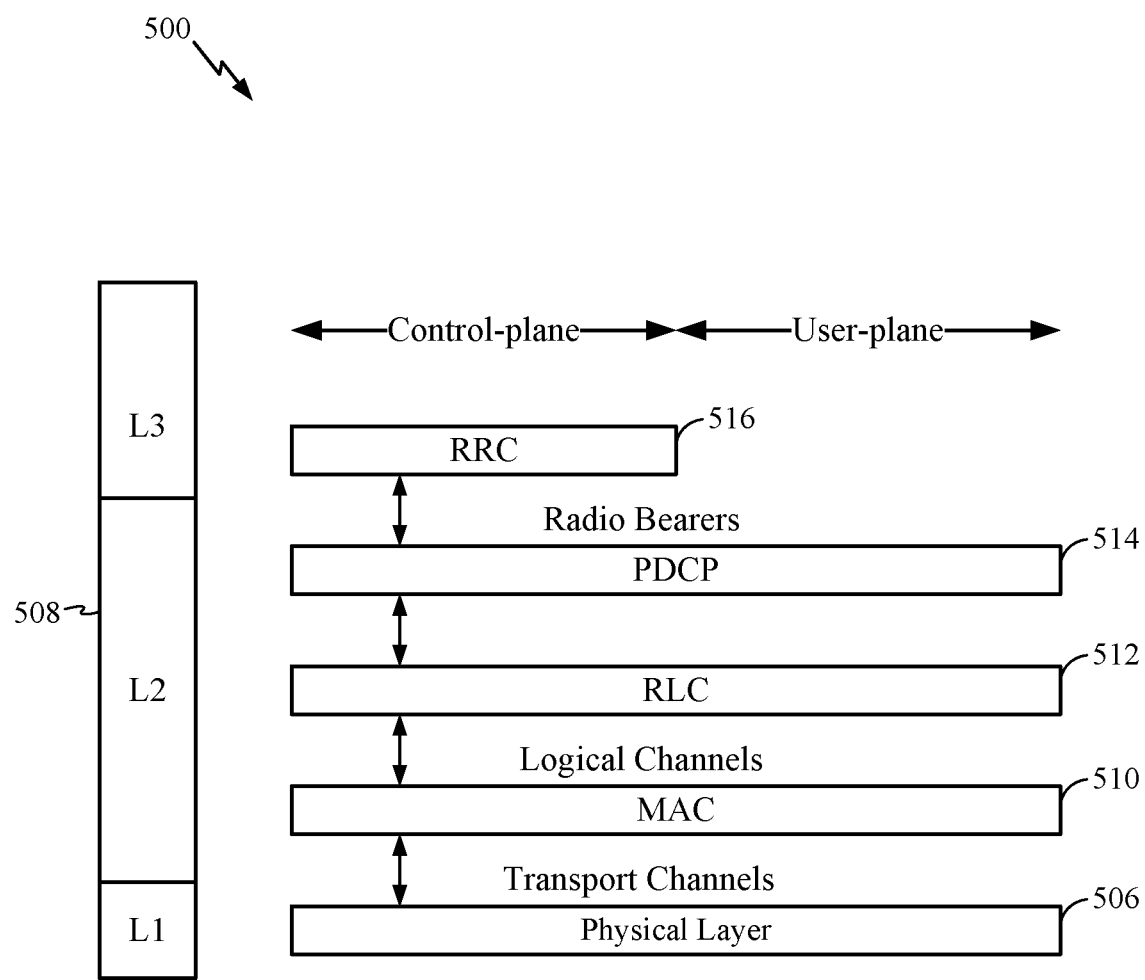
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
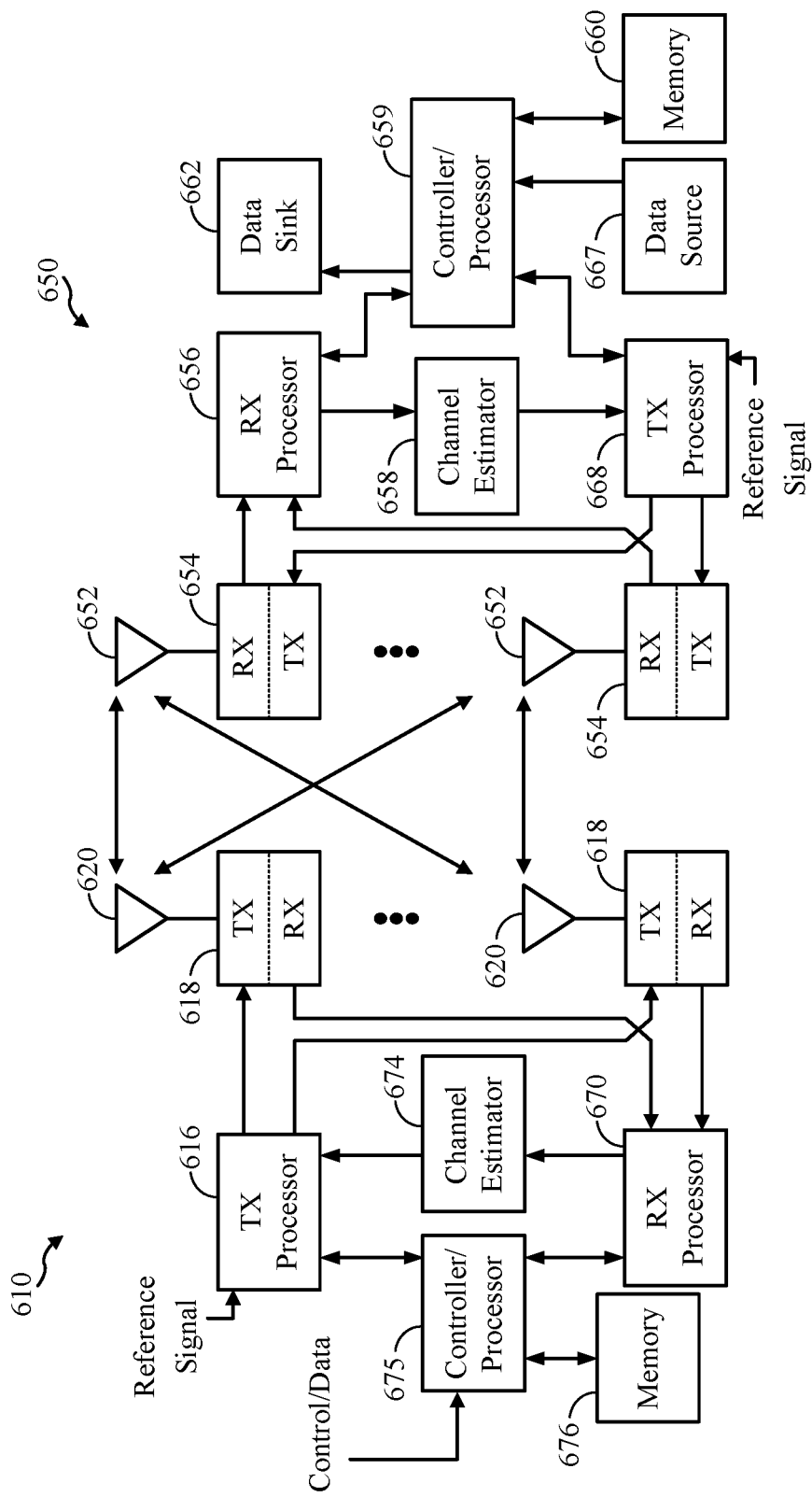
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

In certain aspects, a UE (e.g., UE 650) combines pairs of antenna ports to generate at least first and second combined antenna ports. For each combined port, the UE adds reference signals received on Resource Elements (REs) of each of the combined pair of antenna ports. The UE then determines channel estimates for each combined antenna port based on the added reference signals for the combined port.

In certain aspects, for each of the combined ports, the UE processes data received on data REs in pairs, based on the determined channel estimates of the combined port.

In certain aspects, a Base Station (BS) (e.g., eNB 610) combines pairs of antenna ports to generate the at least first and second combined antenna ports, for transmission in a narrow band region of a larger system bandwidth. For each of the first and the second combined antenna ports, the BS transmits same data on corresponding REs of each of the combined pairs of antenna ports, wherein a receiving UE determines channel estimates for each of the first and second combined ports, and processes the data received in the REs in pairs based on the determined channel estimates.

It may be noted that the UE noted above for implementing the new transmission scheme for NB IoT in accordance with certain aspects of the present disclosure may be implemented by a combination of one or more of the controller 659, the RX processor 656, the channel estimator 658 and/or transceiver 654 at the UE 650, for example. Further, the BS may be implemented by a combination of one or more of the controller 675, the TX processor and/or the transceiver 618 at the eNB 610.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654 receives a signal through its respective antenna 652. Each receiver 654 recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 7:
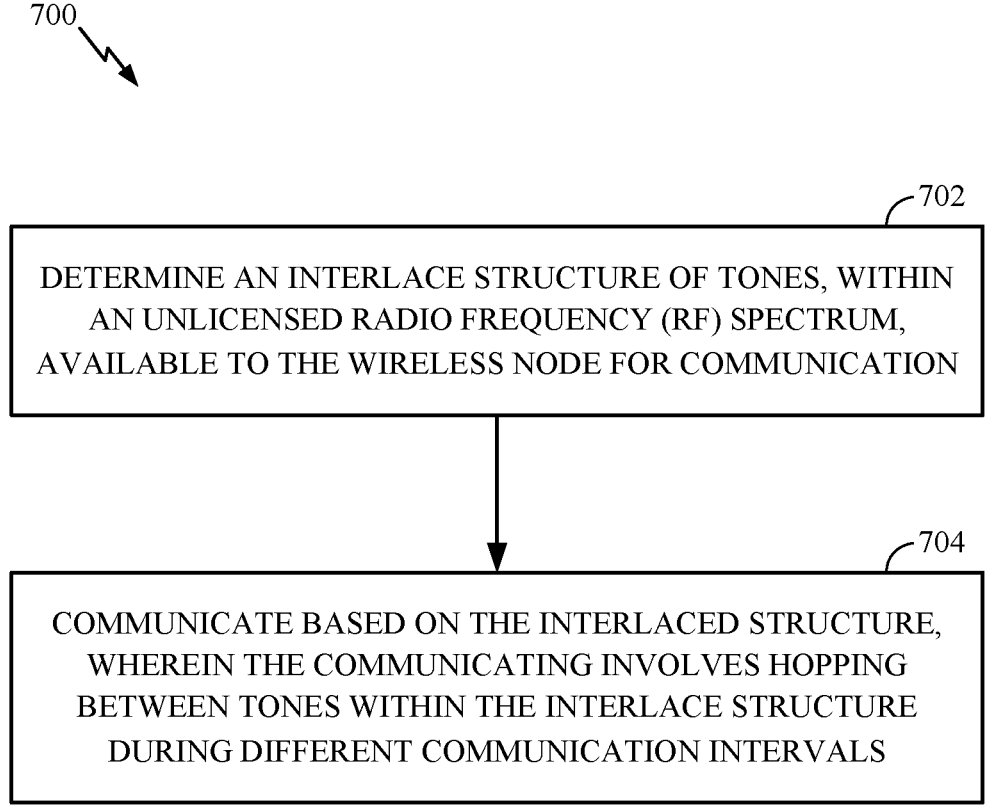
FIG. 7 illustrates example operations for wireless communication using an interlace structure, according to certain aspects of the present disclosure.
Figure 9:
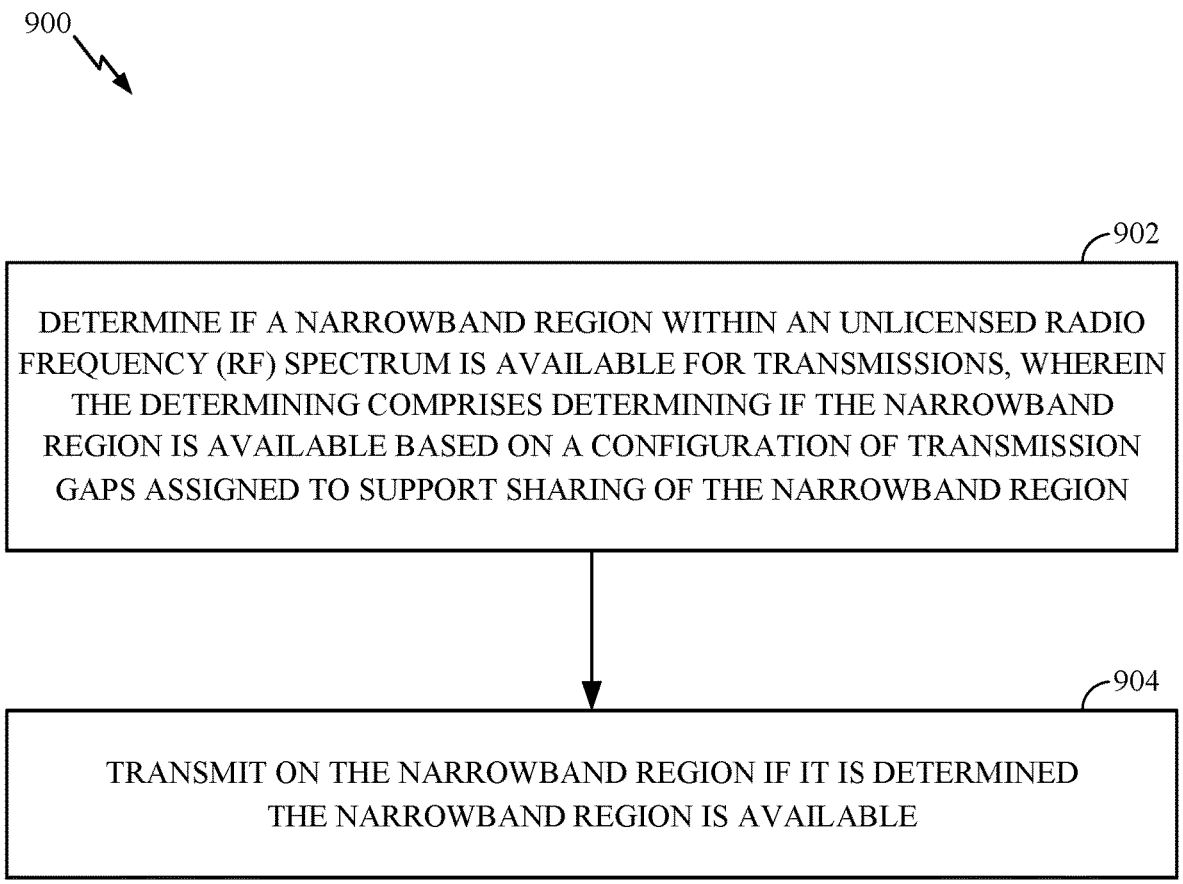
FIG. 9 illustrates example operations for wireless communication in a narrow-band region of an unlicensed radio frequency (RF) spectrum, in accordance with certain aspects of the present disclosure.

The controller/processor 659 and/or other processors, components and/or modules at the UE 650 may perform or direct operations, for example, operations 700 in FIG. 7, operations 900 in FIG. 9, and/or other processes for the techniques described herein for implementing the new transmission scheme. Further, the controller/processor 675 and/or other processors, components and/or modules at the eNB 610 may perform or direct operations, for example, operations 700 in FIG. 7, operations 900 in FIG. 9, and/or other processes for the techniques described herein for implementing the new transmission scheme. In certain aspects, one or more of any of the components shown in FIG. 6 may be employed to perform example operations 700 and 900, and/or other processes for the techniques described herein. The memories 660 and 676 may store data and program codes for the UE 650 and eNB 610 respectively, accessible and executable by one or more other components of the UE 650 and the eNB 610.

Internet-of-Things (IoT) Design for Unlicensed Spectrum

The Internet-of-Things (IoT) is a network of physical objects or "things" embedded with, for example, electronics, software, sensors, and network connectivity, which enable these objects to collect and exchange data. IoT allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure.

Machine type communications (MTC) and/or enhanced MTC (eMTC) may refer to communication involving at least one remote device on at least one end of the communication and may include forms of data communication which involve one or more entities that do not necessarily need human interaction. MTC devices may include devices that are capable of MTC and/or eMTC communications with MTC servers and/or other MTC devices through Public Land Mobile Networks (PLMN), for example. Narrow-band IoT (NB-IoT) is a narrowband radio technology specially designed for the IoT, which may have a special focus on indoor coverage, low cost, long battery life and large number of devices.

MTC/eMTC and NB-IoT in the licensed spectrum may be low cost. For example, MTC/eMTC may be implemented in the licensed spectrum using one antenna, half-duplex (HD), narrowband (1.8 MHz), and with small transport block (TB) size (1,000 bits). Moreover, MTC/eMTC may have a simplified operation by using a limited number of transmission modes (TM), and limited feedback. MTC/eMTC may be low power by including a power save mode (PSM) and extended discontinuous reception (eDRX). NB-IoT may operate in a narrow band of 180 kHz, with new primary synchronization sequence (PSS), secondary synchronization sequence (SSS), physical broadcast channel (PBCH), physical random access channel (PRACH), physical downlink shared channel (PDSCH), and physical uplink shared channel (PUSCH), and may have a single tone uplink (UL). NB-IoT may have extended coverage by use of transmission time interval (TTI) bundling, and have a simplified communication protocol.

NB-IoT and eMTC have been standardized for LTE licensed spectrum. However, there are various advantages in extending the design of NB-IOT/eMTC to the unlicensed deployment. Aspects of the present disclosure are generally directed to design principles for extending IoT (e.g., NB-IoT, MTC/eMTC, etc.) in the unlicensed radio frequency (RF) band spectrum.

NB-IoT and MTC/eMTC deployed in the unlicensed spectrum may take advantage of listen before talk (LBT) operations and may use a floating twelve symbol demodulation reference signal (DMRS) and a discovery window of six milliseconds (PSS/SSS/cell-specific reference signal (CRS)). Moreover, single and multiple subframe (SF) scheduling, and self and cross transmission opportunity (TxOp) scheduling may be used. In certain aspects, an interlaced UL structure may be used, which may have power spectral density (PSD) limitations. This may be band and/or region dependent, e.g. for 5 GHz in Europe, and a bandwidth (BW) occupancy of 80% may be realized e.g., for 5 GHz in Europe.

The unlicensed spectrum at 3.5 GHz may use PSS/SSS repetition within DMRS measurement time configuration (DMTC) (only one time for coverage). Master information block (MIB)/enhanced system information block (eSIB) transmissions may be used and with support for physical random access channel (PRACH) and physical uplink control channel (PUCCH). Random access channel (RACH) may be a four step procedure and may support a shortened format (e.g., a total of four symbols of DMRS and data) and long format (e.g., 1 ms).

Contention based UL data transmissions may be supported, which may include, for example, a header with UL control information (UCI), i.e. modulation coding scheme (MCS), modulation. Radio link monitoring (RLM) may also be supported, as well as radio resource management (RRM), radio link failure (RLF), handover and neutral host. In some cases, LBT may not be used in the unlicensed spectrum, however, LBT and channel selection may be designed for interference avoidance.

Motivation for extending eMTC and NB-IoT in the unlicensed spectrum may include having a unified design for the licensed and unlicensed spectrums, which may result in lower deployment and device costs. Moreover, for non-operator deployment, currently, the only choice for non-operator deployment are proprietary solutions.

In some aspects, a standalone deployment mode may be supported, which may not involve supplemental downlink (SDL), and no carrier aggregation, for cost reasons. Moreover, legacy signals may not be handled in order to increase efficiency.

In some aspects, in-band and guard-band may be supported. The bands that may be supported in the unlicensed spectrum may include sub-GHz, e.g. 900 MHz. WiFi channelization may be different for LTE and may have an impact on channel selection. In some aspects, 3.5 GHz band may be a primary target for IoT in the unlicensed spectrum.

Certain aspects of the present disclosure are generally directed to backwards compatibility when implementing IoT (e.g., NB-IoT/eMTC, etc.) for the unlicensed spectrum. Backward compatibility may increase the reuse of IoT (e.g., NB-IoT/eMTC, etc.) designs and reduce development costs, and may result in mass production which drives down device costs.

IoT may be deployed in the unlicensed spectrum, for in-band deployment, with backward compatibility, and forward compatibility to 5G in the unlicensed spectrum. Since LTE in the unlicensed spectrum may be targeting small cells, a similar target may be used for eMTC in unlicensed band. On the other hand, a similar design target as NB-IoT may be used. Moreover, a reduced upper layer stack may be used (e.g., with only control plane (data over Non-access stratum (NAS)) for operator deployed). Other features may include simple processing and position location. In some cases, BW limitation may not be used in all regions/bands (e.g., for 3.5 GHz deployment).

Certain bands and regions may implement 80% bandwidth occupancy limitations to increase transmit power. Thus, a simplified interlaced structure may be used for uplink. For example, to implement 80% bandwidth occupancy a device may support wideband RF and wideband sensing.

FIG. 7 illustrates example operation 700 for wireless communication, in accordance with certain aspects of the present disclosure. The operations 700 may be performed, for example, by a wireless node, such as the eNB 610 or the UE 650.

The operations 700 begin at 702 by determining an interlace structure of tones, within an unlicensed radio frequency (RF) spectrum, available to the wireless node for communication. At 704, the operations 700 continue by communicating based on the interlaced structure, wherein the communicating involves hopping between tones within the interlace structure during different communication intervals. In certain aspects, the interlace structure comprises a plurality of resource blocks (RBs), each RB comprising a plurality of tones. In some aspects, the interlace structure may include a plurality of non-adjacent single tones.

In some aspects, the number of interlaces supported for the unlicensed spectrum may be limited to, for example, one interlace, which reduces complexity and limits packet size. With one interlace within a 20 MHz BW, 10×12×12×2 coded bits may be used for QPSK. Power amplifier (PA) backoff may be factored in because the waveform may not be single carrier. In some aspects, instead of implementing interlacing at the resource block (RB) level, interlacing can be implemented at the sub-RB level or at a single tone level.

In some aspects, the wireless node performing the operations 700 may be a wireless node of a first type (e.g., NB-IoT/eMTC device). In this case, an interlace structure may be used for communication by devices of the first type and another interlace structure may be used for communication by devices of a second type (e.g., other LTE devices).

Figure 8:
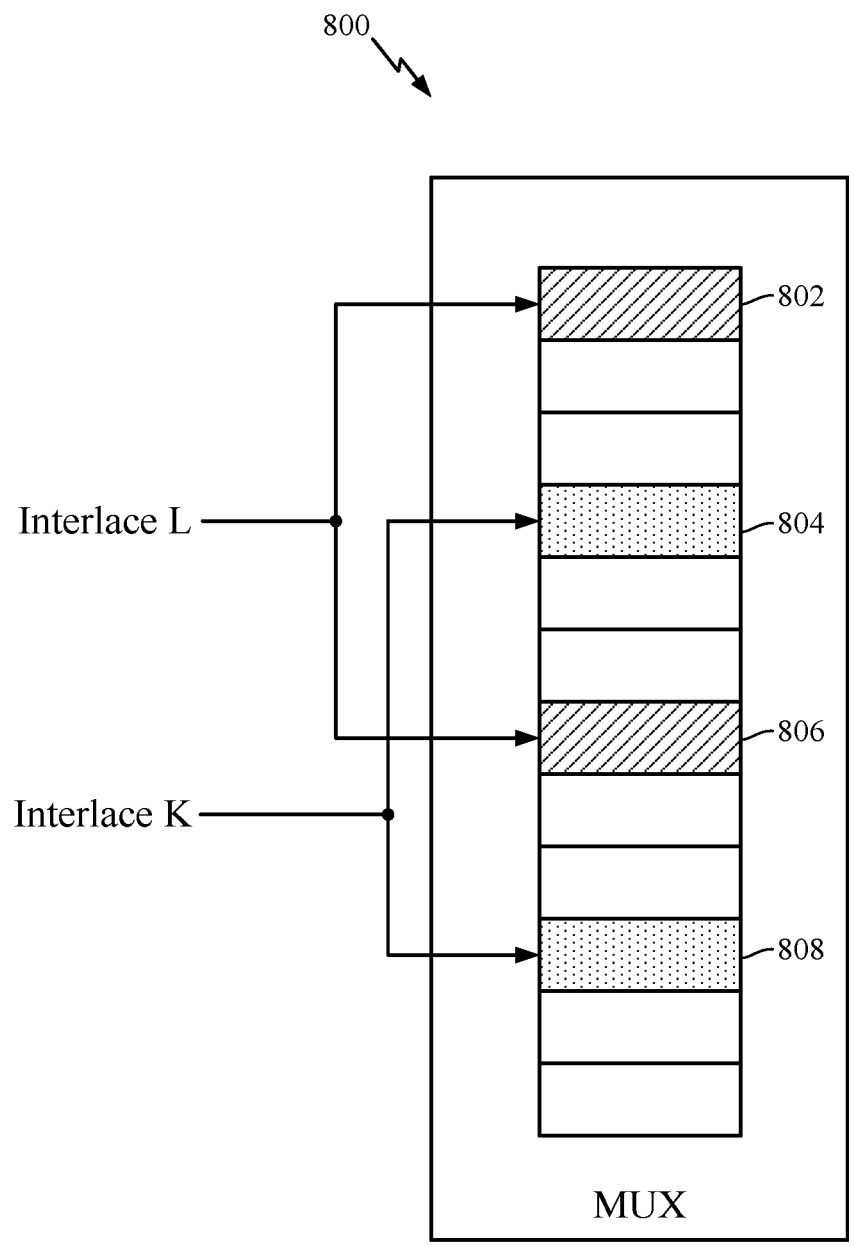
FIG. 8 illustrates an example interlace structure, in accordance with certain aspects of the present disclosure.

FIG. 8 illustrates an interlace structure 800 including an interlace L and an interlace K, in accordance with certain aspects of the present disclosure. Interlace L may occupy resources 802 and 806, and interlace K may occupy resources 804 and 808. Each of resources 802, 806, 804, and/or 808 may be a narrowband region. In some aspects, devices of the second type (e.g., other LTE devices) may occupy one or more interlaces (e.g., interlace L), and devices of a first type (e.g., NB-IoT/eMTC devices) may occupy one or more other interlaces (e.g., interlace K). In some aspects, tones of the interlace structure used for communication devices of the first type may be non-overlapping with tones of the other interlace structure.

In some aspects, NB-IoT/eMTC devices may occupy a single RB at a time, but may hop across the RBs within the occupied interlace (e.g., interlace K) over time. For example, an NB-IoT/eMTC device may occupy interlace K, and may hop across RBs during different communication intervals. In some cases, instead of implementing an interlace structure at an RB level, an interlace structure may be implemented at a sub-RB or single tone level. For example, each of resources 804 and 808 may be a single tone. An NB-IoT/eMTC device may hop between tones within the interlace structure (e.g., interlace K) during different communication intervals.

In some cases, the interlace structure may be implemented in a narrow-band region of the unlicensed spectrum. In some aspects, transmission power may be reduced with the implementation of coverage enhancement techniques. Moreover, later repetitions may have larger delay because of LBT operations. In some cases, when using single tone, more efficient power amplifiers (PAs) can be used. Using a single tone may result in PSD limitation, which may be a consequence of the 80% BW consumption rule and total power limitations for 5 GHz, at least in Europe.

FIG. 9 illustrates example operation 900 for wireless communication, in accordance with certain aspects of the present disclosure. The operations 900 may be performed, for example, by a wireless node, such as the eNB 610 or the UE 650.

The operations 900 begin at 902 by determining if a narrowband region within an unlicensed radio frequency (RF) spectrum is available for transmissions. In certain aspects, the determining at block 902 may include determining if the narrowband region is available based on a configuration of transmission gaps assigned to support sharing of the narrowband region. At 904, the operations 900 continue by transmitting on the narrowband region if it is determined the narrowband region is available.

For some regions/bands, LBT may not be used, however, it may be desirable to have interference avoidance mechanisms. One option is to deploy LBT/clear channel assessment (CCA) for IoT (e.g., NB-IoT/eMTC, etc.) in the unlicensed spectrum. For example, the determination at 902 may involve performing a clear channel assessment (CCA) within the narrowband region. In this case, a wireless node may be configured to sense a declared bandwidth to determine if a channel is clear for transmission. For example, if six RBs are declared, then six RBs may be sensed instead of the entire bandwidth. In some aspects, for UEs that hop across different narrowband regions, the narrowband that the UE hops to can be sensed, or the narrowband the UE intends to use can be sensed.

Figure 10:
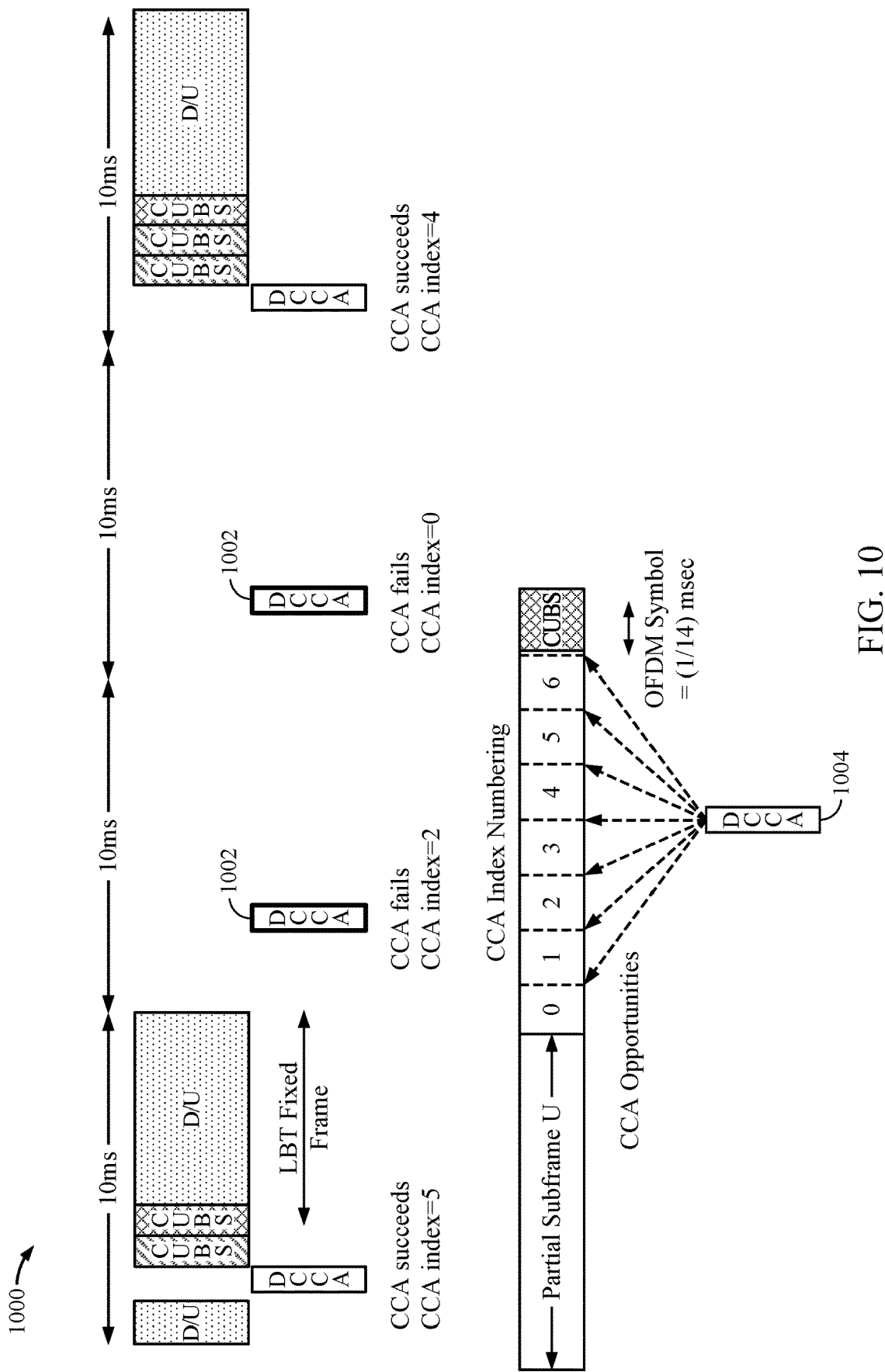
FIG. 10 illustrates an example of synchronous operation using clear channel assessment procedures, in accordance with certain aspects of the disclosure.

FIG. 10 illustrates an example of synchronous operation 1000 in an unlicensed spectrum using CCA, in accordance with certain aspects of the disclosure. Synchronized operation may be used to manage the unlicensed spectrum resources among operators. Synchronized operation may be achieved, for example, through the use of LBT/CCA 1002. According to certain aspects, CCA reuse may allow for coordination among different operators (e.g., by having CCA opportunities as shown in FIG. 10 at 1004). The CCA location or CCA index numbering for an operator may be randomized over time to maintain fairness among operators.

Certain aspects of the present disclosure are directed to a frame design for determining duration of a gap for the CCA opportunities. In some aspects, duration of the gap for the CCA opportunities may be five percent of the duration of the frame. For example, for a 10 ms frame, the gap may be 0.5 ms, and for a 20 ms frame, the gap may be 1 ms. This frame based design allows for implementation of a deterministic timing between eNB and UE for CCA/LBT. This technique is a simple implementation for both the eNB and the UE, and allows for scheduled transmissions. However, with this technique, there may be issues with synchronized communications if WiFi or other asynchronized operators share the medium.

In certain aspects, IoT may be deployed in the unlicensed spectrum without LBT. In this case, transmission gaps may be maintained as supported in NB-IoT to achieve certain medium sharing/fairness. For example, an eNB may broadcast or RRC signal a UE about a configuration for transmission gaps. Thus, the eNB/UE can decide what percentage of the channel to occupy for fairness via the transmission gap configuration.

Certain aspects of the present disclosure are directed to cell acquisition in the unlicensed spectrum. For cell acquisition, full reuse of procedure applied to LTE in the unlicensed spectrum may not provide sufficient coverage for IoT in the unlicensed spectrum. One solution may be to extend PSS/SSS repetition. For example, the number of repetitions may be increased to greater than two repetitions. In this case, additional cover code, scrambling or sequence/root/shift selection may be used. Another solution may be to leverage NB-IoT design, i.e. with a single RB PSS/SSS/PBCH, or to Support physical broadcast channel (PBCH) and system information block (SIB) repetition.

Another issue with cell acquisition in the unlicensed spectrum may involve the bundling of broadcast channels. For example, SIB may occupy the medium too long. One solution may involve implementing a modified broadcast channel/signal design to allow predefined transmission gaps for shared medium usage. Another option may be to perform CCA based on broadcast signal transmissions with repetition in each burst, or with a large number of bursts, e.g., longer time with fixed content. In some cases, transmission of NB-PSS may be continuous in 11 symbols, but the transmission opportunity may be subject to CCA, as opposed to having a separation between NB-PSS and NB-SSS of one or more SFs, with a separate CCA for each. For example, in certain aspects, IoT in the unlicensed spectrum may be implemented with consecutive NB-PSS/NB-SSS and based on the same CCA instead of having a conditioned/floating time relationship. In some aspects, the separation between NB-PSS and NB-SSS may be maintained when communicating in the licensed RF spectrum, but when communicating in the unlicensed spectrum, consecutive NB-PSS/NB-SSS may be used.

With regards to data communication, the medium in the unlicensed spectrum may be shared with the use of CCA operations, by using transmission gaps within bundles. In this case, the communication pattern may be fixed and known to both the eNB and the UE. Moreover, the transmission of CRS may be discontinuous.

In some aspects, the medium in the unlicensed spectrum may be shared with CCA. In some cases, retransmission of data may be relied on, instead of postponing data transmission, in case of a drop/puncture if CCA fails.

In some cases, transmission gaps between NB-PDCCH and NB-PDSCH may be an issue because an eNB would perform two separate CCA for NB-PDCCH and NB-PDSCH, respectively. In certain aspects, back-to-back NB-PDCCH and NB-PDSCH communication may be supported, following a single CCA. Moreover, aspects of the present disclosure support a dynamic split of NB-PDCCH and NB-PDSCH durations within a transmission opportunity (TXOP). For example, a 10 ms TXOP may be split equally between NB-PDCCH and NB-PDSCH, or one of NB-PDCCH or NB-PDSCH may occupy the TXOP for a longer duration. In some aspects, the duration of the NB-PDCCH and NB-PDSCH may be adjusted dynamically.

Certain aspects of the present disclosure are generally directed to techniques for detection of DL transmissions. This may be more challenging for IoT in the unlicensed spectrum than LTE where the operating signal-to-noise ratio (SNR) is higher.

One solution involves relying on intensified CRS for detection. For example, transmitting in a narrow-band region of an unlicensed spectrum may comprise including a higher proportion of reference signals (RS) in a beginning portion of a downlink transmission to enhance detection (e.g., front loading RSs). In some aspects, the RSs may include one or more symbols of DMRS. An increased density of CRS may be used, which serves the purpose of transmission detection and may serve as DMRS. In some cases, a lesser density of RSs may be used as baseline and the density may be increased for large coverage.

Certain aspects of the present disclosure may be directed to techniques for UL detection. In some cases, UL detection may be implemented based on DMRS, but there may be no power boost in this case. In some cases, UL detection may be implemented with 8 ms or 10 ms transmission intervals, and/or autocorrelation based on the same repeated patterns. In some cases, an UL transmission may be transmitted in accordance with a fixed pattern after a passed CCA. For example, the UL transmission may be transmitted at a fixed (e.g., predetermined) time. In some cases, the CCA may be performed at a fixed (e.g., predetermined) time.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for performing, means for communicating, means for indicating, and/or means for including, may comprise a processing system, which may include one or more processors, such as the TX processor 616, transmitter(s) 618, and/or the controller/processor 675 of the wireless base station 610 illustrated in FIG. 6, and/or the TX processor 668, the transmitter(s) 654, and/or the controller/processor 659 of the user equipment 650 illustrated in FIG. 6. Means for transmitting, means for communicating, and/or means for sending may comprise a transmitter, which may include TX processor 616, transmitter(s) 618, and/or the antenna(s) 620 of the wireless base station 610 illustrated in FIG. 6, and/or the TX processor 668, the transmitter(s) 654, and/or the antenna(s) 652 of the user equipment 650 illustrated in FIG. 6. Means for receiving may comprise a receiver, which may include RX processor 670, receiver(s) 618, and/or the antenna(s) 620 of the wireless base station 610 illustrated in FIG. 6, and/or the RX processor 656, the receiver(s) 654, and/or the antenna(s) 652 of the user equipment 650 illustrated in FIG. 6.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a wireless node, comprising:

determining if a narrowband region within an unlicensed radio frequency (RF) spectrum is available for transmissions, wherein the determining comprises determining if the narrowband region is available based on a configuration of transmission gaps assigned to support sharing of the narrowband region;

performing a clear channel assessment (CCA) within the narrowband region; and transmitting on the narrowband region if it is determined the narrowband region is available, wherein the transmitting comprises transmitting both a narrowband physical downlink control channel (NB-PDCCH) and a narrowband physical downlink shared channel (NB-PDSCH) after a single passed CCA, a duration of the NB-PDCCH and the NB-PDSCH being dynamically adjusted.

2. The method of claim 1, further comprising transmitting broadcast narrowband synchronization signals subject to the CCA.

3. The method of claim 2, wherein the transmitting the broadcast narrowband synchronization signals comprises transmitting both primary synchronization signals (PSS) and secondary synchronization signals (SSS) after another single passed CCA.

4. The method of claim 2, further comprising transmitting primary synchronization signals (PSS) and secondary synchronization signals (SSS) in a licensed RF spectrum, wherein the PSS is transmitted after a first passed CCA and the SSS is transmitted after a second passed CCA.

5. The method of claim 1, wherein the NB-PDCCH and NB-PDSCH have different durations within a same transmission opportunity (TXOP).

6. The method of claim 1, wherein the CCA is performed at a predetermined time.

7. The method of claim 1, wherein the CCA is performed in a defined gap within a frame structure.

8. The method of claim 1, wherein the transmitting comprises transmitting an uplink transmission after another passed CCA, wherein a transmission time of the uplink transmission is predetermined.

9. The method of claim 1, wherein the configuration of the transmission gaps is adjusted based on occupancy of a medium used for broadcast or data communications.

10. The method of claim 1, receiving signaling indicating the configuration of transmission gaps.

11. The method of claim 1, wherein the transmission gaps accommodate bundled transmissions.

12. The method of claim 1, further comprising performing cell acquisition in accordance with the configuration of transmission gaps.

13. The method of claim 12, wherein performing cell acquisition comprises monitoring for broadcast signals transmitted in accordance with the configuration of transmission gaps.

14. The method of claim 1, wherein the transmitting comprises front-loading reference signals (RSs) of a downlink transmission such that a higher proportion of the RSs are transmitted in a beginning portion of the downlink transmission as compared to other portions of the downlink transmission.

15. An apparatus for wireless communication, comprising:
a processing system configured to:
determine if a narrowband region within an unlicensed radio frequency (RF) spectrum is available for transmissions, wherein the determining comprises determining if the narrowband region is available based on a configuration of transmission gaps assigned to support sharing of the narrowband region, and
perform a clear channel assessment (CCA) within the narrowband region; and
a transmitter configured to transmit on the narrowband region if it is determined the narrowband region is available, by transmitting both a narrowband physical downlink control channel (NB-PDCCH) and a narrowband physical downlink shared channel (NB-PDSCH) after a single passed CCA, a duration of the NB-PDCCH and the NB-PDSCH being dynamically adjusted.

16. An apparatus for wireless communication, comprising:
means for determining if a narrowband region within an unlicensed radio frequency (RF) spectrum is available for transmissions, wherein the means for determining comprises means for determining if the narrowband region is available based on a configuration of transmission gaps assigned to support sharing of the narrowband region;
means for performing a clear channel assessment (CCA) within the narrowband region; and
means for transmitting on the narrowband region if it is determined the narrowband region is available, wherein the transmitting comprises transmitting both a narrowband physical downlink control channel (NB-PDCCH) and a narrowband physical downlink shared channel (NB-PDSCH) after a single passed CCA, a duration of the NB-PDCCH and the NB-PDSCH being dynamically adjusted.

17. A non-transitory computer-readable medium having instructions stored thereon for:
determining if a narrowband region within an unlicensed radio frequency (RF) spectrum is available for transmissions, wherein the determining comprises determining if the narrowband region is available based on a configuration of transmission gaps assigned to support sharing of the narrowband region;
performing a clear channel assessment (CCA) within the narrowband region; and
transmitting on the narrowband region if it is determined the narrowband region is available, wherein the transmitting comprises transmitting both a narrowband physical downlink control channel (NB-PDCCH) and a narrowband physical downlink shared channel (NB-PDSCH) after a single passed CCA, a duration of the NB-PDCCH and the NB-PDSCH being dynamically adjusted.

* * * * *